(12) United States Patent
Alam et al.

(10) Patent No.: US 7,721,278 B2
(45) Date of Patent: May 18, 2010

(54) MODULAR SERVER ARCHITECTURE FOR MULTI-ENVIRONMENT HTTP REQUEST PROCESSING

(75) Inventors: Bilal Alam, Sammamish, WA (US); Erik B. Olson, Sammamish, WA (US); Anil K. Ruia, Issaquah, WA (US); Michael D. Volodarsky, Seattle, WA (US); David Wang, Issaquah, WA (US); Jaroslav Dunajsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 11/140,192

(22) Filed: May 27, 2005

(65) Prior Publication Data

US 2006/0288085 A1 Dec. 21, 2006

(51) Int. Cl.
*G06F 9/44* (2006.01)
*G06F 9/45* (2006.01)
*G06F 3/00* (2006.01)

(52) U.S. Cl. ........................ 717/167; 717/131; 719/332

(58) Field of Classification Search ....................... None
See application file for complete search history.

(56) References Cited

U.S. PATENT DOCUMENTS

| | | | | |
|---|---|---|---|---|
| 5,870,550 A | * | 2/1999 | Wesinger et al. | 709/218 |
| 5,892,900 A | * | 4/1999 | Ginter et al. | 726/26 |
| 7,506,316 B2 | * | 3/2009 | Vertes | 717/130 |
| 2003/0018827 A1 | * | 1/2003 | Guthrie et al. | 709/318 |
| 2003/0204644 A1 | * | 10/2003 | Vincent | 709/317 |
| 2005/0010930 A1 | * | 1/2005 | Vaught | 719/318 |
| 2005/0071850 A1 | * | 3/2005 | Ittel et al. | 719/320 |
| 2005/0234781 A1 | * | 10/2005 | Morgenstern et al. | 705/26 |
| 2006/0265344 A1 | * | 11/2006 | Woods | 707/1 |
| 2007/0061277 A1 | * | 3/2007 | Boden et al. | 707/1 |
| 2009/0254487 A1 | * | 10/2009 | Dhar et al. | 705/80 |

* cited by examiner

*Primary Examiner*—Neveen Abel Jalil
*Assistant Examiner*—Tarek Chbouki
(74) *Attorney, Agent, or Firm*—Merchant & Gould, P.C.

(57) ABSTRACT

Methods are provided for utilizing a modular server architecture for processing requests for services, such as authorization and authentication, in a web server. The modular server architecture includes self-contained modular components that can be plugged in and out of the web server, as needed, to provide requested web services. The modular server architecture is also extensible in that it provides set of server APIs for processing requests for supporting built-in server functionality as well as functionality provided by third party modular components. The modular server architecture also supports the integration of request processing tasks for both native and managed modular components, such as ASP.NET modules, by virtue of a managed module host component. The modular server architecture also optimizes server performance by only providing modular component functionality when needed. By utilizing the modular server architecture, server functionality is extended, duplication of request processing tasks is eliminated and performance administrative overhead is reduced.

16 Claims, 7 Drawing Sheets

MODULAR SERVER ARCHITECTURE FOR MULTI-ENVIRONMENT HTTP REQUEST PROCESSING

BACKGROUND OF THE INVENTION

In computer networks, such as the Internet, web servers receive and fulfill requests for data made by a data client such as a web browser running on one or more client computers. Once a request has been received by a web server, the web server processes the request according to a protocol such as HyperText Transfer Protocol ("HTTP"). HTTP defines how messages are formatted and transmitted, and what actions web servers and clients should take in response to various commands. For example, when a URL for a web page is entered in a browser, an HTTP command is sent to a web server directing it to fetch and transmit the requested web resource. Web servers are capable of sending data to many client computers at the same time, thus allowing multiple client computers to obtain the same web resource simultaneously. The functionality of web servers is provided by software applications installed on computers connected to a network.

Existing web servers are highly specialized software programs that provide a large set of features necessary to serve a wide variety of resource types, and support various aspects of the HTTP protocol, such as request authentication and caching of resources. These features are normally tightly integrated inside the web server implementation for performance reasons, and provide little extensibility to the end consumer. This makes it difficult to customize the behavior of the web server by removing unneeded features, or replacing them with custom implementations. The provided extensibility model is normally restrictive, difficult to use due to the highly specialized nature of the system, and exposes few aspects of the server operation. The development of extended functionality for such systems traditionally incurs high costs due to their complexity and cost of development.

The need for more control over the responses served by web servers and ability to rapidly develop web applications for serving rich dynamic content has led to the creation of many scripting or application development layer implementations (such as Active Server Pages ("ASP"), Hypertext Preprocessor ("PHP"), and ASP.NET). These platforms provide richer interfaces as well as utility functionality to aid in developing dynamic web applications, and utilize higher level languages to simplify the task of application development. However, these application development layer implementations have traditionally been limited due to being layered on top of web server products and the resulting inability to provide low level control over request processing. Additionally, these platforms frequently duplicate processing tasks that are already implemented by the web server and that power the application development layer, resulting in reduced performance due to increased runtime and memory demands of the application development layer, and administrative overhead in managing each duplicated feature twice.

It is with respect to these considerations and others that the various embodiments of the present invention have been made.

BRIEF SUMMARY OF THE INVENTION

In accordance with the present invention, the above and other problems are solved by methods for utilizing a modular server architecture for processing requests for resources, and providing relevant request processing services such as authorization and authentication, in a web server. The modular server architecture includes self-contained modular components that can be plugged in and out of the web server, as needed, to provide requested request processing services. The modular server architecture is also extensible in that it provides a rich set of server APIs for controlling server operation and performing request processing. These APIs can be used inside the modular components to implement built-in server functionality as well as extended functionality provided by third party components. The modular server architecture also supports the integration of request processing tasks for both native modules and modules developed using a higher level application development platform, such as ASP.NET, by virtue of a server component that implements the hosting of such modules. This enables components developed using such a layer to have full control over the server behavior as if they were interfacing with the native server API directly, and allows duplicate server features to be removed in favor of a unified implementation of each feature. The modular server architecture also optimizes server performance by allowing an administrator to select the set of modular component functionality that is needed for the application, and remove others to improve the performance and reduce the security surface area of the server. This selection can be made either statically by defining the set of features needed by the application, or dynamically by associating features with conditions that determine whether or not the feature is provided at runtime based on various request information.

According to one aspect of the invention, a method is provided for utilizing modular components for dynamically implementing services in a web server application program. The method includes exposing removable modules for access by the web server application program, receiving a request for a resource in the web server application program, determining one or more modules required for providing the requested resource during request processing, enabling one or more of the modules determined to provide the requested resource, and executing the one or more enabled modules for processing the request.

The removable modules may include modules native modules and managed modules. The native modules are modular components which are not built in the web server application program. The native modules are configured for desired services (such as request processing services) in the web server application program. The managed modules are modular components which are not built in the web server application program. The managed modules are developed using an application development platform. One example of an application development platform upon which managed modules may be developed is ASP.NET although other application development platforms may also be utilized. The managed modules are configured for desired services (such as request processing services) in the web server application program. The request for the resource may be for one or more server applications which are capable of providing the resource. The modules may be enabled by loading the modules determined to provide the required request processing services and executing them in a desired order to provide the desired server features for the processing of the requested resource. The method further includes determining one or more modules not needed for providing the requested web service and disabling the one or more modules determined to be not needed during the processing of the requested resource.

According to another aspect of the invention, a method is provided for executing a plurality of native and managed modules that provide request processing services during one or more request processing stages provided by the server pipeline inside the web application server program. These stages in the server pipeline are known as request events. The method includes a module for receiving a request event in the web server application program, and performing a request processing service appropriate to the event. The request events may include authentication, authorization, or logging in the web server application program (among others). The server pipeline is in communication with native modules including a native module known as the managed module host in the web server application program. The method further includes upon receiving the request event in the server pipeline, forwarding the request event to the native modules and the managed module host. The method further includes sending a notification directly to native modules determined for processing the request event. The native module that implements the managed module host executes to determine if one or more of managed modules hosted by the managed module host provides a service for processing the request event and if a managed module provides a service for processing the request event, then forwarding the notification to the managed module determined for processing the request event. The managed module may be an ASP.NET module which provides a service for processing the request event. The module host can implement support for modules developed using other application development environments, such as PHP.

According to another aspect of the invention, a method is provided for extending the functionality of a web server for processing server events. The method includes providing a rich set of native APIs for creating a native module that can control the server operation by utilizing multiple server functions. These functions include receiving, from the single server source, one or more server events and performing processing which extends the functionality of the web server. The method further includes providing a rich set of managed APIs for creating a managed module that can control the server operation by utilizing multiple server functions. These functions include receiving, from the single server source, one or more server events and performing processing which extends the functionality of the web server. The managed module host provides the runtime translation of native API functions to managed API functions. The method further includes compiling a native module using the native set of APIs into a native dynamic link library which includes defined entry points (or notifications) into the web server, and registering it with the server configuration to enable it. The method further includes compiling the managed module using the managed set of APIs into an executable managed binary, and registering it with the server configuration to enable it. The native and managed modules are loaded and executed on the web server in response to a server event.

According to another aspect of the invention, a method is provided for configuring the execution of modules for processing request events in a web server. The method includes configuring one or more preconditions for determining the loading of native modules and managed modules in the web server, receiving a request event for a service in the web server and determining at runtime whether to load and execute native and managed modules for processing the request event based on the one or more preconditions. The native and managed modules are selectively associated with the one or more preconditions. The preconditions may include loading and executing modules based on the type of resource (i.e., native or managed) needed for processing the request.

The invention may be implemented as a computer process, a computing apparatus, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a server computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including multiprocessor systems, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
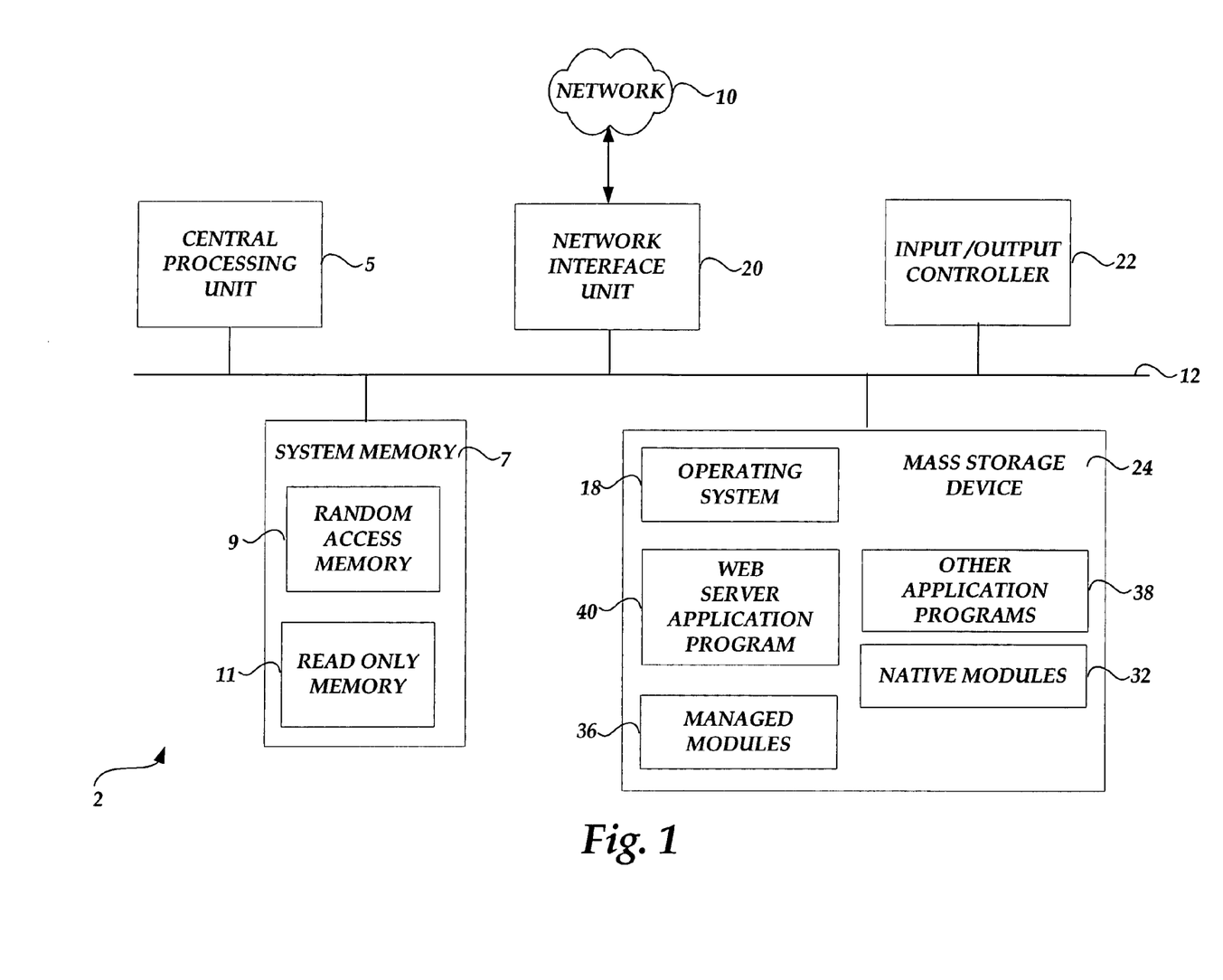
FIG. 1 is a computer system architecture diagram illustrating aspects of a client computer system utilized in and provided by the various embodiments of the invention.

Referring now to FIG. 1, an illustrative computer architecture for a server computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The server computer 2 further includes a mass storage device 24 for storing an operating system 18, a web server application program 40 (hereinafter "web server"), native modules 32, managed modules 36, and other program modules, which will be described in greater detail below.

As used herein, the terms "native modules" and "managed modules" refer to self-contained program modules which may be loaded and executed by the web server 40 to provide services (i.e., processing) in response to requests received by the web server 40 from an external source, such as a web browser. These services may include, but are not limited to, authentication, authorization, response or output caching, static file handling, state acquisition and preservation, logging, and error reporting. Native modules may be dynamic link libraries ("DLLs"). Managed modules are used for services that use other managed components or desire to benefit from rapid application development ("RAD") benefits provided by the managed development platform, such as ASP.NET. As is known to those skilled in the art, RAD is a quality of a programming system that enables programmers to quickly build working programs. Managed modules are developed using the ASP.NET model which is well known to those skilled in the art. In particular, ASP.NET is a server-side Web technology used to create dynamic web applications such as web pages and web services. ASP.NET takes an object-oriented programming approach to web page execution. Every element in an ASP.NET page is treated as an object and run on the server. An ASP.NET page gets compiled into an intermediate language by a .NET Common Language Runtime ("CLR") compliant compiler which is turned into native machine code by a compiler. The machine code is eventually run on a computer processor resulting in the rapid loading of web pages.

The mass storage device 24 is connected to the CPU 5 through a mass storage controller (not shown) connected to the bus 12. The mass storage device 24 and its associated computer-readable media provide non-volatile storage for the server computer 2. Although the description of computer-readable media contained herein refers to a mass storage device, such as a hard disk or CD-ROM drive, it should be appreciated by those skilled in the art that computer-readable media can be any available media that can be accessed by the server computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the server computer 2.

According to various embodiments of the invention, the server computer 2 may operate in a networked environment using logical connections to remote computers through a network 10. It should be appreciated that the network 10 may comprise any type of computing network, including a local area network or a wide area network, such as the Internet. The network 10 provides a medium for enabling communication between the server computer 2 and other computer systems connected to or accessible through the network 10. The server computer 2 may connect to the network 10 through a network interface unit 20 connected to the bus 12. It should be appreciated that the network interface unit 20 may also be utilized to connect to other types of networks and remote computer systems. The server computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 24 and RAM 9 of the server computer 2, including an operating system 18 suitable for controlling the operation of a networked personal computer, such as the WINDOWS SERVER operating system from MICROSOFT CORPORATION of Redmond, Wash. The mass storage device 24 and RAM 9 may also store one or more program modules. In particular, the mass storage device 24 and the RAM 9 may store the web server 40, native modules 32, and managed modules 36, as described above. According to one embodiment of the invention, the web server 40 comprises the Internet Information Server ("IIS") application program from MICROSOFT CORPORATION. It should be appreciated, however, that web servers from other manufacturers may be utilized to embody the various aspects of the present invention.

According to one embodiment of the invention, the web server 40 is operative to respond to requests for services by selectively loading, enabling and executing native and managed modules which are configured to perform specific services during runtime. The web server 40 may be configured to only load and enable modules necessary for performing specific request oriented tasks and to disable and remove modules not necessary for performing the same tasks. In this manner, it will be appreciated that the performance and administrative overhead utilized for loading and executing modules in the web server may be advantageously reduced. An illustrative process for utilizing modules for dynamically implementing services in the web server 40 (i.e., during runtime) will be described in greater detail below with respect to FIG. 4.

According to another embodiment of the invention, the web server 40 may be configured to integrate native and managed module processing by providing a common path for processing requests and providing request services in the web server. An illustrative process for integrating native and managed modules to provide services for processing events in the web server 40 will be described in greater detail below with respect to FIG. 5.

According to another embodiment of the invention, the web server 40 may also be configured for extended functionality in processing server events by providing a set of APIs for creating native modules and a managed module host (also a native module) for receiving request events and for directing the processing of these events by native modules and managed modules in communication with the managed module host. An illustrative process for extending the functionality of the web server 40 as previously discussed will be described in greater detail below with respect to FIG. 6.

According to another embodiment of the invention, the web server 40 may also be configured to enhance performance by selectively executing native and managed modules based on a set of preconditions determined in advance by an administrator. An illustrative process for configuring the web server 40 to execute modules according to the set of preconditions will be described in greater detail below with respect to FIG. 7.

Figure 2:
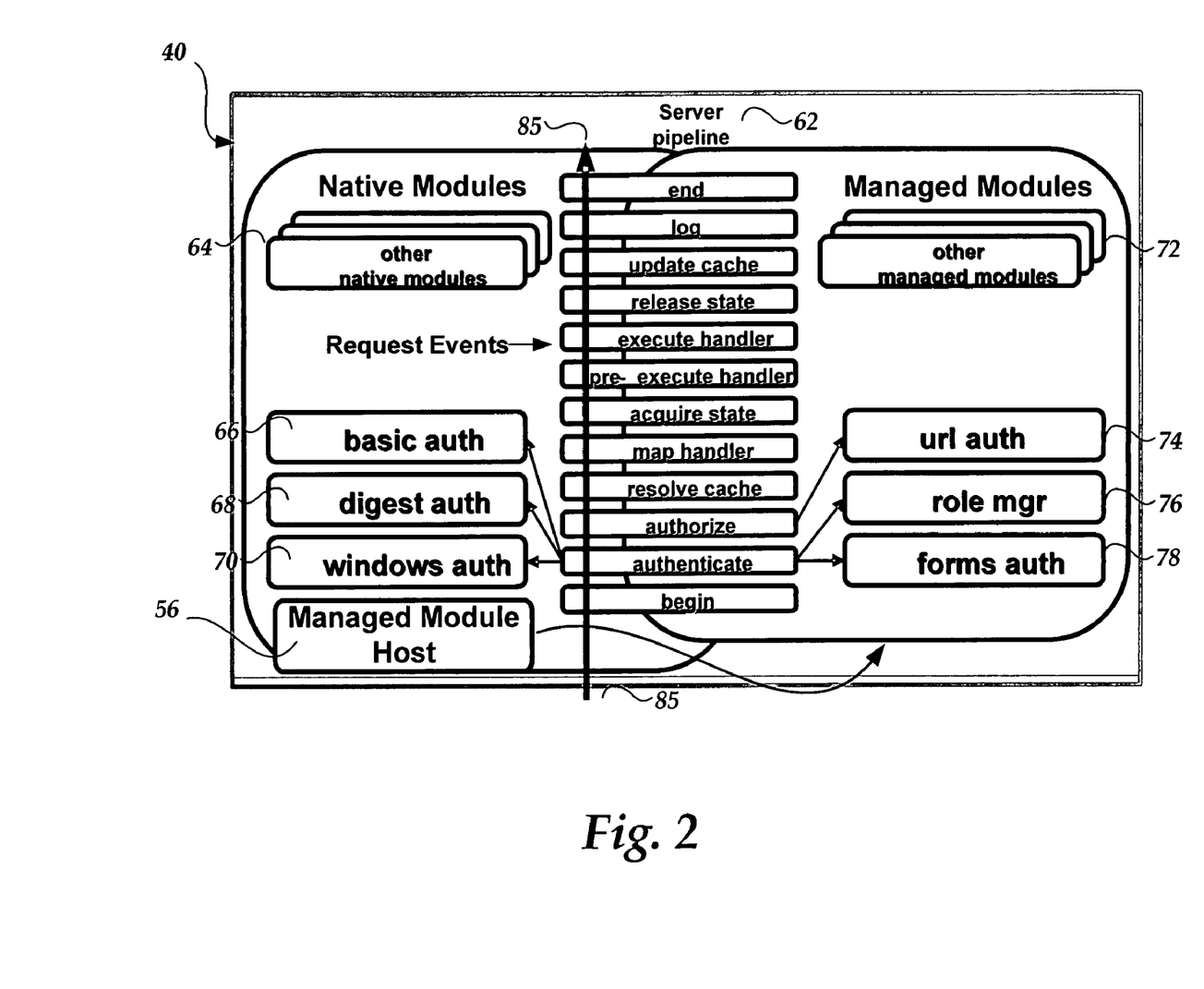
FIG. 2 is an architecture diagram illustrating aspects of the web server application program illustrated in FIG. 1, according to one embodiment of the invention.

FIG. 2 is an architecture diagram illustrating aspects of the web server 40, according to one embodiment of the invention. The web server 40 includes a server pipeline 62 which exposes all of the request events that occur in the server during request processing (i.e., "begin," "authenticate," "authorize," "resolve cache," "map handler," "pre-execute handler," "execute handler," "release state," "update cache," "log" and "end").

The web server 40 also includes native modules 66, 68, and 70 for performing authentication services in response to an authenticate request event including basic authentication, digest authentication, and windows authentication. The aforementioned types of authentication are known to those skilled in the art. The web server 40 also includes managed modules 74, 76, 78 for performing authentication and authorization services in response to authentication and authorization request events, including forms authentication, role manage authorization, and URL authorization. The aforementioned types of authentication and authorization are known to those skilled in the art. The web server 40 further includes a managed module host 56 which is a native module capable of receiving requests events, identifying appropriate managed modules for processing request events, and forwarding the request events to the identified managed modules for processing. The managed module host 56 will be described in greater detail below with respect to FIGS. 4-7.

Figure 3:
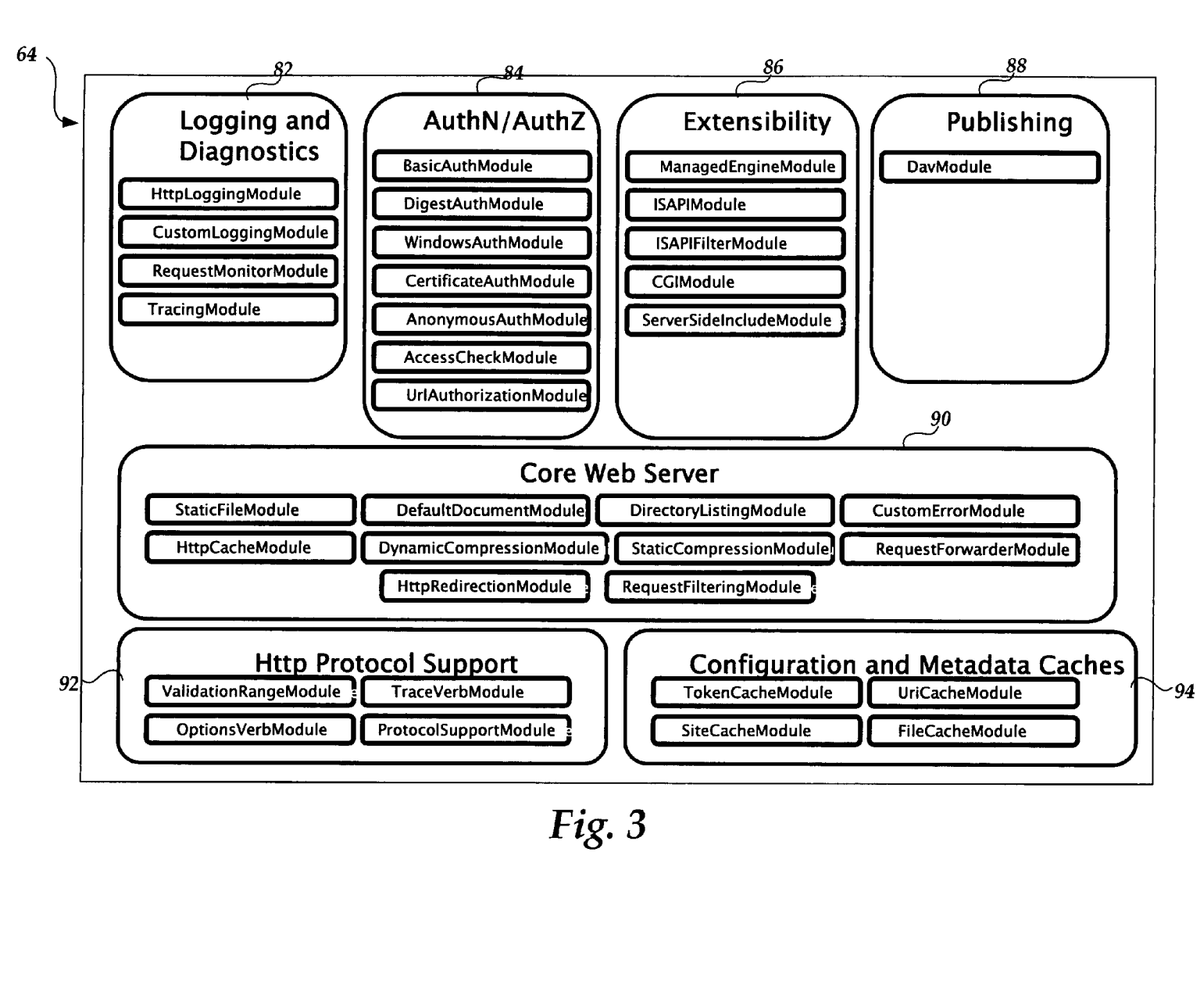
FIG. 3 is a block diagram illustrating various native modules which may be utilized by the web server application program illustrated in FIG. 2, according to one embodiment of the invention.

The web server 40 also may include other native modules 64 and other managed modules 72 for performing a variety of services related to request events. For instance, as shown in FIG. 3, other native modules are shown grouped in the categories logging and diagnostics, authorization, extensibility, publishing, core web server, Http protocol support, and configuration and metadata caches. It will be appreciated that the specifically identified aforementioned native and managed modules as well as the other native modules 64 and the other managed modules 72 may be obtained from a third party source and loaded into the web server 40 as needed to process received request events.

Figure 4:
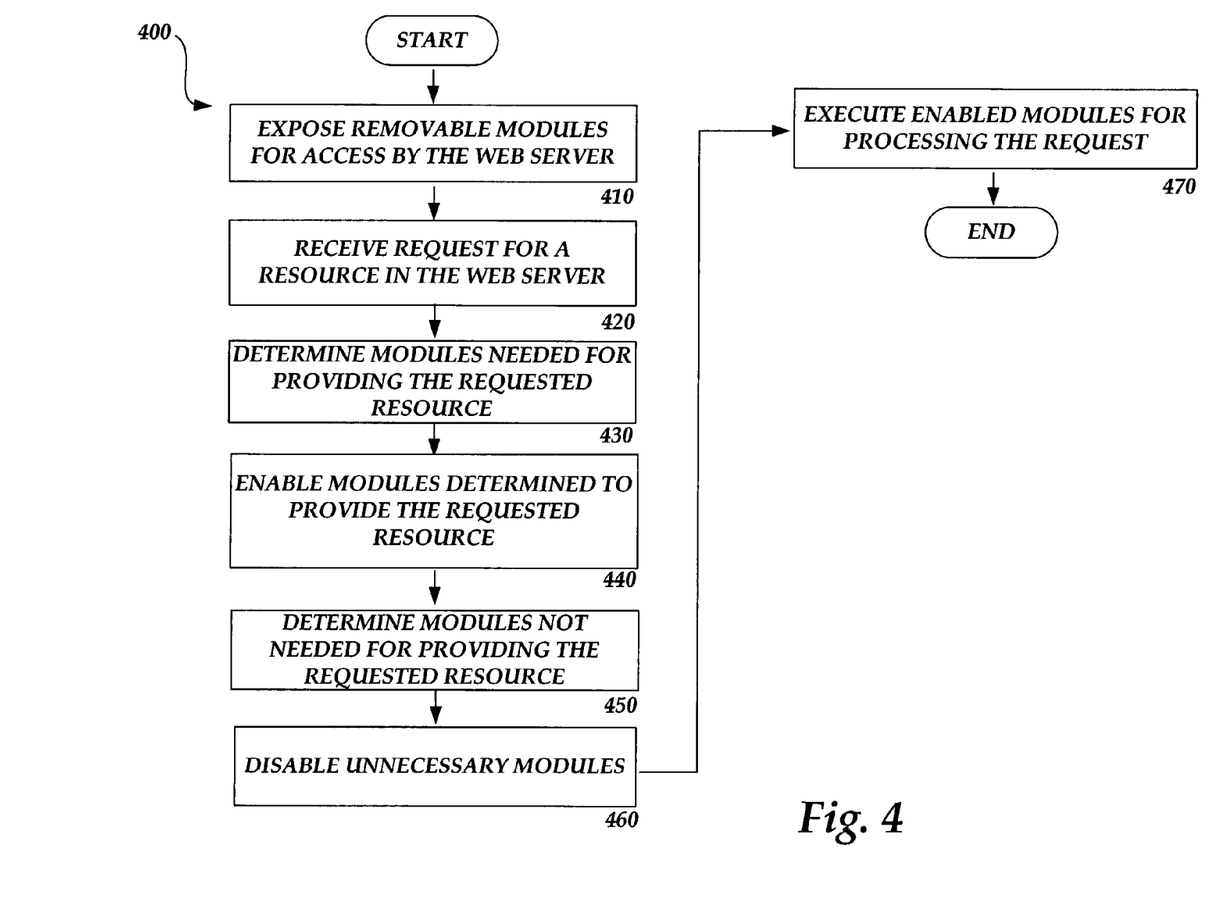
FIG. 4 is a flow diagram illustrating aspects of a process for utilizing modules for dynamically implementing services in a web server, according to one embodiment of the invention.

Referring now to FIG. 4, an illustrative routine 400 will be described illustrating a process performed by the web server 40 for configuring utilizing managed and native modules for dynamically implementing services in a web server, according to one embodiment of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 4-7, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 400 begins at operation 410, where the web server 40 exposes accessible native and managed modules. In particular, the web server 40 may load all or a subset of the modules from an external store to enable functionality for fulfilling a variety of requests. For instance, requests for static file content may require enabling a basic authentication module 66 while a request for ASP.NET content would require a managed role manager module 76. In particular, if a basic authentication module 66 is desired, this module may be added (if not already present) and enabled to provide basic authentication support as part of request processing for such a request. Similarly, if a managed role manager module is desired, the managed module host 56 may be enabled to provide access to the managed role manager ASP.NET module. From operation 410, the routine 400 continues to operation 420, where the web server 40 receives a request for a resource. In particular, and as described above, the request processing for the resource may include processing a number of request events (e.g., authentication and authorization) with each request event requiring a specific module.

From operation 420, the routine 400 continues to operation 430, where the web server 40 determines the native and managed modules needed for providing the requested resource. From operation 430, the routine 400 continues to operation 440 where the web server 40 enables modules determined to be needed for providing the requested resource. From operation 440, the routine 400 continues to operation 450 where the web server 40 determined modules not needed for providing the requested resource, and disables any unnecessary modules at operation 460. For instance, if a requested event does not require a native module, then these modules may be disabled at operation 460 to reduce the performance overhead. From operation 460, the routine 400 continues to operation 470 where the web server 40 executes the enabled modules for processing the request. The routine 400 then ends.

Figure 5:
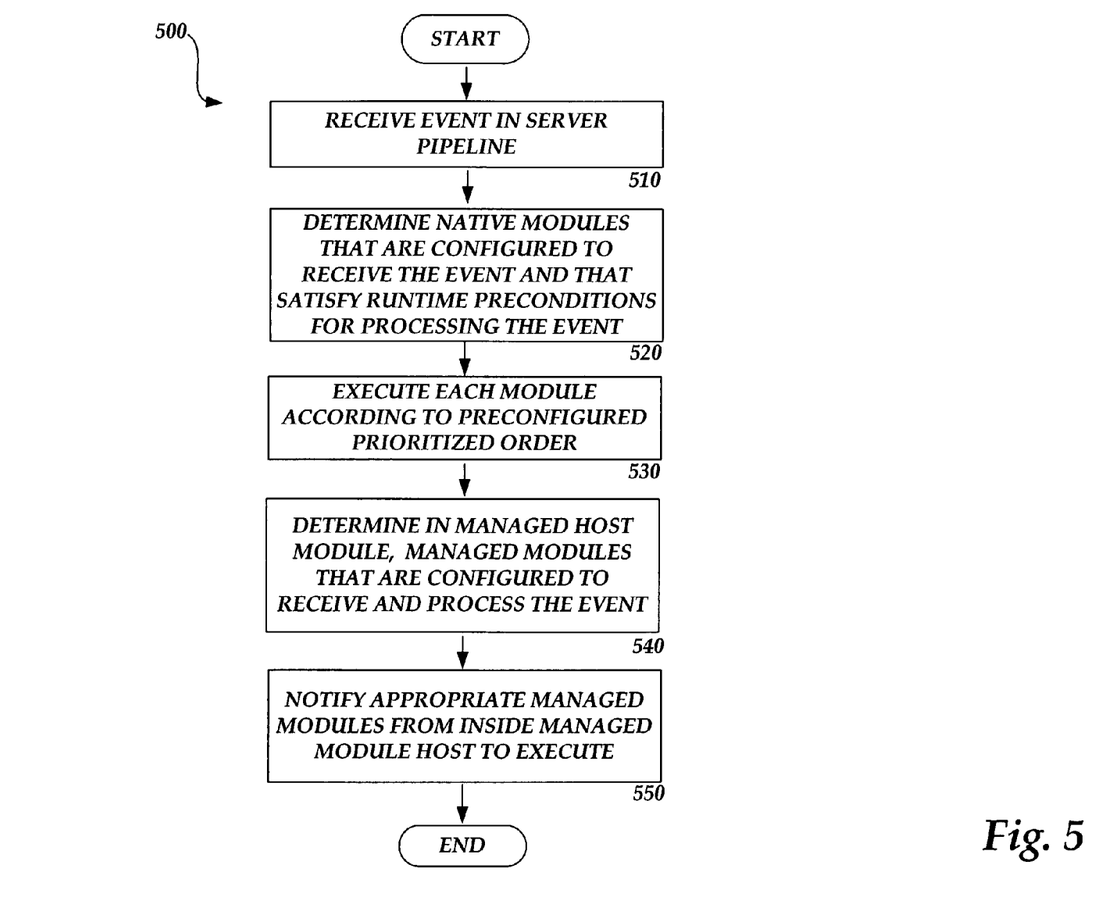
FIG. 5 is a flow diagram illustrating aspects of a process for integrating a plurality of native and managed modules to provide services for processing events in a web server application program, according to one embodiment of the invention.

Referring now to FIG. 5, an illustrative routine 500 will be described illustrating a process performed by the web server 40 for integrating native and managed modules to provide services for processing events, according to one embodiment of the invention. The routine 500 begins at operation 510 where the web server 40 receives an event, such as a request event (e.g., authentication) in the server pipeline 62. From operation 510, the routine 500 continues to operation 520 where the web server 40 determines native modules that are configured to receive the request event and which satisfy runtime preconditions for processing the event. In particular, upon receiving the request event in the server pipeline 62, the web server 40 forwards the request event to the native modules 64, 66, 68, and 70 as well as to the managed module host 56. The web server 40 determines native modules configured to receive and process request events. The managed module host 56 determines managed modules configured to receive and process request events. It will be appreciated that in one embodiment of invention, the web server 40 may be configured with runtime preconditions for loading and executing native modules for processing received request events. For instance, the web server 40 may be configured to load and execute native modules according to a prioritized order established by an administrator. An illustrative method for associated preconditions with the web server 40 will be discussed in greater detail below with respect to FIG. 7.

From operation 520, the routine 500 continues to operation 530 where the web server 40 executes each native module. It will be appreciated that the native modules may be executed according to a preconfigured prioritized order. It will further be appreciated that the native modules which are executed may include the managed module host 56, which, as discussed above, may be utilized for executing managed modules.

From operation 530, the routine 500 continues to operation 540 where, after the managed host module 56 is executed, the managed host module determines whether any managed modules (e.g., managed modules 72, 74, 76, and 78) are configured to receive and process the request event. From operation 540, the routine 500 continues to operation 550 where the managed host module 56 notifies any identified managed modules for processing the request event to execute. The routine 500 then ends.

[MDV1]It should be understood that according to various embodiments of the invention, both native and managed modules are capable of providing services regardless of the type of content. For instance, managed modules such as ASP.NET forms authentication and URL authorization modules may be utilized to protect content on the web server. In addition, it will be appreciated that the server pipeline 62 enables the unification of duplicate features between native and managed modules enabling the configuration of these features (e.g., authorization, caching, and custom errors) to be configured in one place because all module services can apply to all requests, and duplication for different request types is unnecessary.

Figure 6:
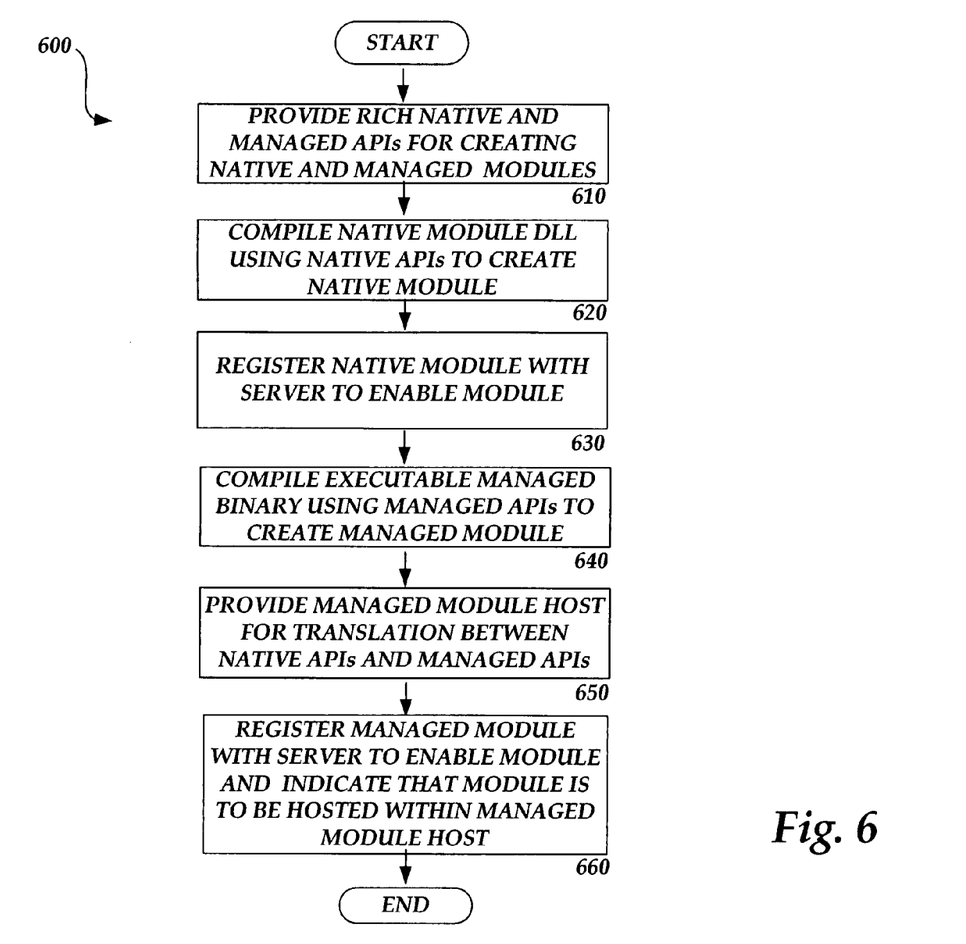
FIG. 6 is a flow diagram illustrating aspects of a process for configuring the execution of modules for processing server events in a web server, according to one embodiment of the invention.

Referring now to FIG. 6, an illustrative routine 600 will be described illustrating a process for configuring the execution of modules for processing server events in the web server 40, according to one embodiment of the invention. The routine 600 begins at operation 610 where rich sets of APIs for creating native and managed modules are provided to the web server 40. In particular, the native and managed modules created by the rich APIs are used for controlling the operation of the web server 40 by utilizing a plurality of server functions including receiving one or more server events from a single server source and performing processing which extends the functionality of the web server 40.

The routine 600 continues from operation 610 to operation 620 where the web server 40 utilizes the set of native APIs to compile a native module dynamic link library ("DLL") to create a native module. The routine 620 continues from operation 620 to operation 630 where the web server 40 registers the native module (i.e., the native module DLL) to enable the native module to be loaded and executed on the web server 40 in response to a server event. In particular, the native module DLL may be registered with a configuration associated with the web server 40. It should be understood that the native module DLL includes defined entry points (or notifications) into the web server 40.

The routine 600 continues from operation 630 to operation 640 where the web server 40 compiles an executable managed binary utilizing the rich managed APIs to create a managed module. The routine 600 continues from operation 640 to operation 650 where a managed module host is provided to the web server 40. It should be understood that the managed module host is a native module and is thus created utilizing the rich native APIs. It should be further understood that the managed module host enables translation between the rich set of native APIs and the rich set of managed APIs. In particular, the managed module host processes notifications for managed modules and then executes the appropriate managed module or modules inside of it. The managed module host translates native server API calls into managed API calls to allow the managed module or modules to perform processing in the server environment.

The routine 600 continues from operation 650 to operation 660 where the web server 40 registers the managed module to enable it and to indicate that the module is to be hosted within the managed module host. The routine 600 then ends.

It will be appreciated that the embodiment of the invention described above with respect to FIG. 6 enables web application environments to be used to build or create modules (e.g., managed modules) having fine grained control over the operation of a web server, even though the modules are not developed directly on the native server API, and are hosted within their own runtime environment which is provided by the managed module host.

Figure 7:
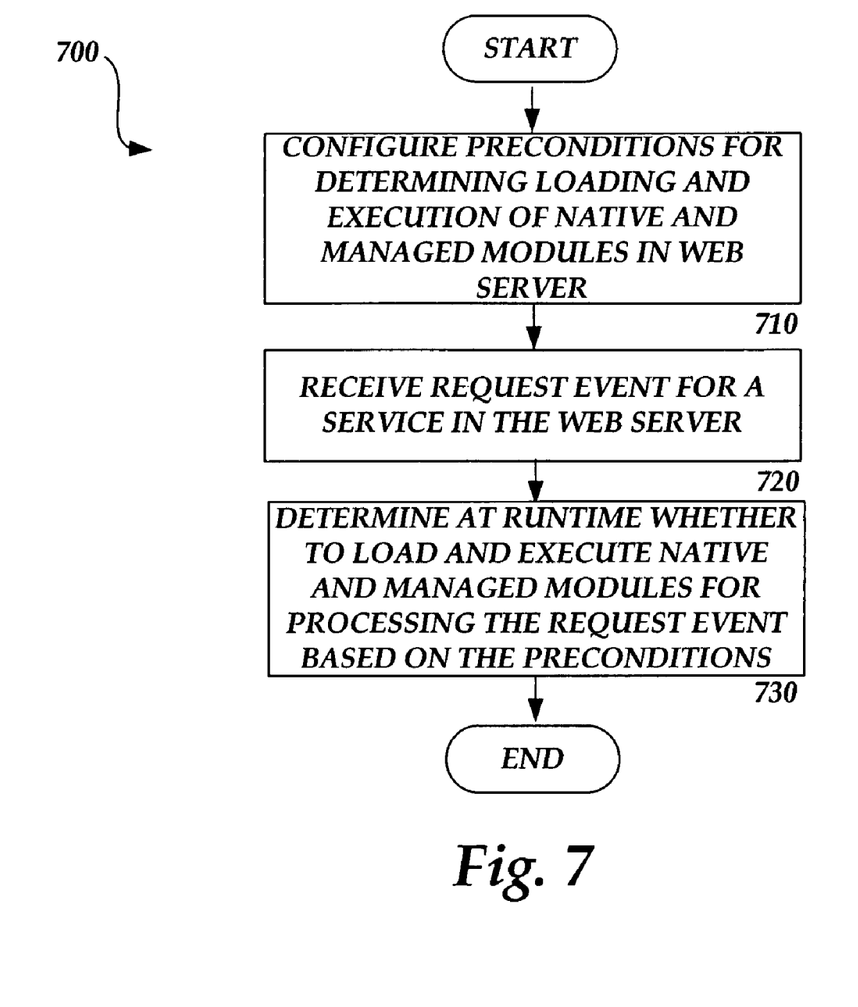
FIG. 7 is a flow diagram illustrating aspects of a process for configuring the execution of modules for processing request events in a web server, according to one embodiment of the invention.

Referring now to FIG. 7, an illustrative routine 700 will be described illustrating a process for configuring the execution of modules for processing request events in the web server 40, according to one embodiment of the invention. The routine 700 begins at operation 710 where an administrator configures a set of preconditions for determining the execution of native and managed modules in the web server 40. In particular, the native and managed modules are selectively associated with the set of preconditions. The routine 700 continues from operation 710 to operation 720 where the web server 40 receives a request event for a service (e.g., authentication). The routine 700 continues from operation 720 to operation 730 where the web server 40 determines at runtime whether to load and execute either native or managed modules (or both) for processing the request event based on the preconditions. The routine 700 then ends.

It will be appreciated that an administrator may configure as a precondition in the web server 40 to only load and execute native modules for certain request events, thereby saving overhead and resources by not executing managed (i.e., ASP.NET) modules. For instance, if a request event contains a directive to reply in another language, the web server 40 may load a native translation module that translates the server response into the requested language.

Based on the foregoing, it should be appreciated that the various embodiments of the invention include methods for utilizing a modular server architecture for processing requests for resources that require processing services such as authorization and authentication, in a web server. The modular server architecture includes self-contained modular components that can be plugged in and out of the web server, as needed, to provide requested web services. The modular server architecture is also extensible in that it provides set of server APIs for processing requests for supporting built-in server functionality as well as functionality provided by third party modular components. The modular server architecture also supports the integration of request processing tasks for both native and managed modular components, such as ASP.NET modules, by virtue of a managed module host component. The modular server architecture also optimizes server performance by only providing modular component functionality when needed. By utilizing the modular server architecture, server functionality is extended, duplication of request processing tasks is eliminated and performance and administrative overhead is reduced.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for utilizing a plurality of modular components for dynamically implementing services in a web server application program, comprising:

exposing a plurality of modules for access by the web server application program; wherein the modules are not built into the web server application and are selectively loaded, enabled and executed by the web server application during a runtime of the web server application program to perform a specific task and removed, and disabled and removed by the web server application during the runtime after performing the specific task; wherein the modules include native modules and managed modules, wherein the native modules and the managed modules are not built in the web server application program and are configured for desired services in the web server application program, wherein the native modules are created using a native set of Application Programming Interfaces (APIs) and wherein the managed modules are created using a managed set of APIs provided by an application development platform for developing web applications; wherein the native set of APIs are different from the managed set of APIs;

receiving a request for a resource in the web server application program; wherein the resource is available within at least one of the plurality of removable modules;

determining from both the native modules and the managed modules at least one of the plurality of modules for providing the requested resource during request processing;

after determining the at least one of the plurality of modules for providing the requested resource loading and enabling the at least one of the plurality of modules determined to provide the requested resource; wherein the at least one of the plurality of modules determined to provide the requested resource is enabled while the web server application program is running; and executing the at least one of the plurality of enabled modules for processing the request.

2. The method of claim 1 further comprising:

determining at least one of the plurality of modules not needed for providing the requested resource; and disabling and removing the at least one of the plurality of modules determined to be not needed during request processing.

3. The method of claim 2, wherein disabling the at least one of the plurality of modules determined to be not needed for providing the request comprises disabling at least one feature of the at least one of the plurality of modules.

4. The method of claim 1, wherein enabling the at least one of the plurality of modules determined to provide the requested resource, comprises:

loading the at least one of the plurality of modules determined to provide the requested resource; and executing the loaded modules in a predetermined order.

5. The method of claim 4, wherein enabling the at least one loaded module comprises enabling at least one feature of the at least one loaded module for providing the requested resource.

6. The method of claim 1, wherein exposing the plurality of managed modules comprises exposing a plurality of ASP.NET modules.

7. The method of claim 1, wherein receiving a request for a resource provided by the web server application program comprises receiving a request for at least one server application for providing the resource.

8. A method for integrating a plurality of native and managed modules to provide services for processing request events in a web server, comprising:

receiving a request event in a server pipeline, wherein the server pipeline is in communication with a plurality of pre-loaded native modules in the web server, the plurality of native modules including a managed module host, wherein the managed module host hosts a plurality of managed modules; wherein the managed modules are selectively loaded, enabled and executed by the web server application during a runtime of the web server application program to perform a specific task and removed, and disabled and removed by the web server application during the runtime after performing the specific task; wherein the native modules are created using a native set of Application Programming Interfaces (APIs) and wherein the managed modules are created using a managed set of APIs provided by an application development platform for developing web applications: wherein the native set of APIs are different from the managed set of APIs; wherein the native modules and the managed modules are not built in the web server application program and are configured for desired services in the web server application program;

upon receiving the request event in the server pipeline, first forwarding the request event to the plurality of native modules including the managed module host;

executing the managed module host to determine if at least one of the plurality of managed modules hosted by the managed module host provides a service for processing the request event;

determining if any of the remaining plurality of native modules provides a service for processing the request event;

when at least one of the plurality of managed modules provides a service for processing the request event, then sending a notification from the managed module host to load and execute the at least one of the plurality of managed modules; and when at least one of the remaining plurality of native modules provides a service for processing the request event, then sending a notification directly to the at least one of the remaining plurality of native modules to execute the at least one of the remaining plurality of native modules; wherein the module selected to process the request event is enabled while the web server is running.

9. The method of claim 8, wherein the managed module host and the remaining plurality of native modules are executed according to a preconfigured prioritized order.

10. The method of claim 8, wherein then sending a notification from the managed module host to execute the at least one of the plurality of managed modules comprises sending a notification to execute at least one ASP.NET module which provides a service for processing the request event.

11. A method for extending the functionality of a web server for processing a plurality of server functions, comprising:

providing a rich set of native application programming interfaces (APIs) for creating a native module for controlling the operation of the web server by utilizing a plurality of server functions;

providing a rich set of managed application programming interfaces for creating a managed module for controlling the operation of the web server by utilizing a plurality of server functions; wherein the native APIs are different from the managed APIs; wherein the managed module is developed using an application development platform for developing web applications;

providing a managed module host for providing runtime translation of the server functions provided by the native set of application programming interfaces, to the server functions provided by the set of managed application programming interfaces;

compiling a native module dynamic link library, utilizing the set of native application program interfaces, to create the native module;

registering the native module dynamic link library with a configuration for the web server to enable the native module to be loaded and executed on the web server during execution in response to a web server event;

compiling an executable managed binary, utilizing the set of managed application programming interfaces, to create the managed module; and registering the managed module with the configuration for the web server to enable the managed module to be loaded and executed on the web server during execution in response to a web server event, wherein registering the managed module comprises indicating that the managed module is to be hosted within the managed module host; wherein the managed module is selectively loaded, enabled and executed by the web server application during a runtime of the web server application program to perform a specific task and removed and disabled and removed by the web server application during the runtime after performing the specific task.

12. The method of claim 11, wherein the plurality of server functions comprise receiving one or more server events from a single server source and performing processing which extends the functionality of the web server.

13. The method of claim 11, wherein the managed module host is a native module compiled utilizing the set of managed application programming interfaces.

14. The method of claim 11, wherein the native dynamic link library includes defined entry points into the web server.

15. A method for configuring the execution of a plurality of modules for processing events in a web server, comprising:

configuring one or more preconditions for determining the loading and execution of native modules and managed modules in the web server, wherein the native and managed modules are selectively associated with the one or more preconditions;

wherein the native modules and the managed modules are not built into the web server and are selectively loaded, enabled and executed by the web server application during a runtime of the web server to perform a specific task and removed, and disabled and removed by the web server during the runtime after performing the specific task;

wherein the native modules are created using a native set of Application Programming Interfaces (APIs) and wherein the managed modules are created using a managed set of APIs provided by an application development platform for developing web applications: wherein the native set of APIs are different from the managed set of APIs;

receiving an event comprising a request for a service in the web server while the web server is running; and determining while the web server is running whether to load and execute at least one of a native module and a managed module as part of the web server already running for processing the event based on the one or more preconditions.

16. The method of claim 15, wherein determining whether to load and execute at least one of a native module and a managed module for processing the event based on the one or more preconditions comprises determining whether to load and execute at least one of a native module and a managed module for processing the server event based on the type of module needed for processing the event.

* * * * *